Figure 1:
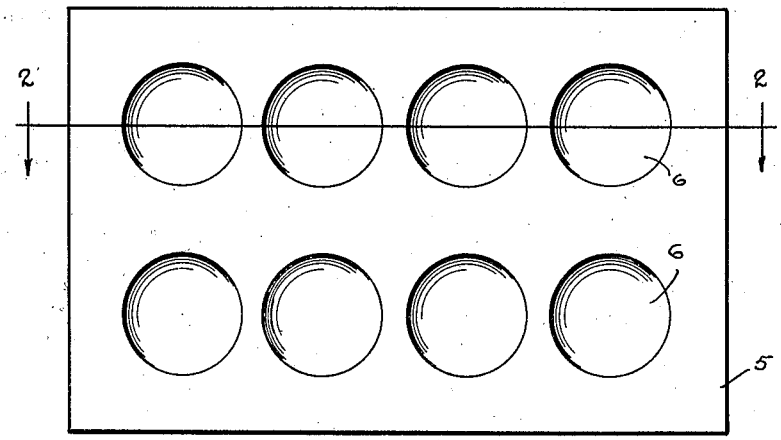

Sept. 24, 1935.　　　　W. PLATT　　　　2,015,496

INFANT FOOD

Filed Jan. 3, 1933

INVENTOR
Washington Platt
BY Paul R. Ames
ATTORNEY

Patented Sept. 24, 1935

2,015,496

UNITED STATES PATENT OFFICE 2,015,496

INFANT FOOD

Washington Platt, Syracuse, N. Y., assignor to The Borden Company, New York, N. Y., a corporation of New Jersey Application January 3, 1933, Serial No. 649,785

4 Claims. (Cl. 99—14)

This invention relates to the preparation and preserving of infants' food and more particularly to the preserving of human breast milk.

Human breast milk is, of course, an ideal food for young infants and is particularly useful in the feeding of prematures and sick infants, where cows' milk often may not be used. It is not, however, available at all times and places and many efforts have been made to find a satisfactory method for preserving such milk, hitherto without success.

It is an object of this invention to provide a process and apparatus by which human breast milk may be preserved in a form suitable for infant feeding without the necessity of any subsequent process other than thawing and warming; and so that it may be kept for several months or more and readily transported. Another object is to provide a new product which may be used in preparing a food for infants, etc. Other objects will become apparent.

The requirements for the freezing of cows' milk are radically different from those for the freezing of human milk.

Cows' milk is a comparatively stable emulsion while human milk is a much less stable emulsion. It is therefore more difficult to freeze in such a way that the emulsion will be preserved and the milk remain digestible by infants. It is common knowledge that milk frozen in the ordinary manner, comparatively slowly, has the emulsion partially broken. And it is widely recognized by the medical profession and others (see, for example, McLean and Fales, "Scientific Nutrition of Infancy and Early Childhood", page 214, Lea & Febiger, Philadelphia, 1925) that frozen milk may be the cause of digestive disturbance in infants. However, numerous clinical tests have definitely established the fact that human milk frozen as herein described is entirely suitable as a food for young infants without any further treatment other than thawing and warming.

The process and apparatus here described has been designed with particular reference to these fundamental differences between the requirements for freezing cows' milk and those for freezing human milk, and with further reference to the particular requirements of a food which must be suitable to feed directly to young or premature infants without any further treatment other than thawing and warming, such treatment, namely, as could be carried out successfully in any home.

The invention includes the freezing of the pasteurized or unpasteurized human breast milk under such conditions that upon thawing the natural emulsion will remain substantially unbroken and the other characteristics will remain sufficiently unchanged so that the thawed product will be suitable for infant feeding. The frozen product may then be placed in suitable receptacles, for example, the bottles from which the infant is to be fed, and may be stored at a low temperature, preferably at about 10° F. or lower, until it is to be used. Whereupon it may be slowly thawed and warmed to the desired temperature and in such cases fed to the infant without removing it from the receptacle and without any other processing.

Figure 2:
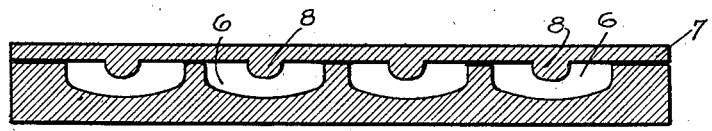
Figure 3:
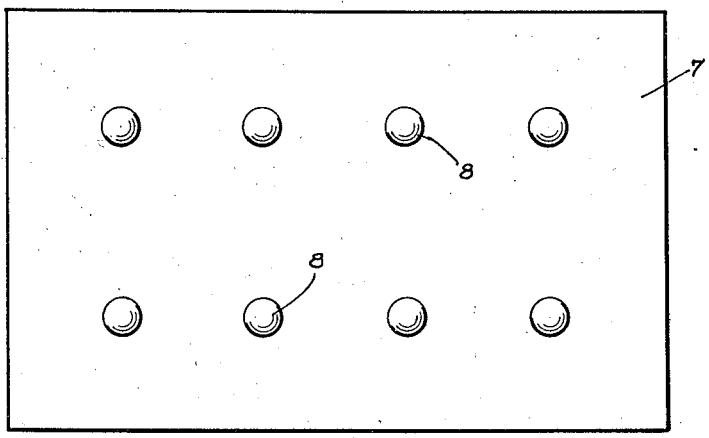

In the drawing, Figure 1 is a plan view illustrating the lower portion of the apparatus in which the milk may be frozen. Figure 2 is a section taken on the line 2—2 of Figure 1 with the top portion of the apparatus in position and Figure 3 is a bottom plan view of the top portion of the apparatus.

The tray 5 which may be of aluminum or other suitable metal, is provided with depressions or wells 6 which are preferably shallow as compared to their diameter and may be of any desired shape which will give the desired configuration to the wafer resulting from the freezing operation and will allow ready removal of the frozen wafer.

The cover 7, which is adapted to fit tightly over the tray 5, is preferably provided with buttons or knobs 8 positioned to project into the central portions of the wells 6.

In using the above described apparatus, the human breast milk, after being pasteurized, is cooled to slightly above its freezing point and poured into the molds or wells 6 of the tray 5, and the cover 7 is applied and securely fastened to the tray by clamps or other suitable means (not shown). The tray and cover should have been already cooled to a low temperature. The tray with its cover must then be subjected to a sufficiently low temperature to very rapidly freeze the milk in the wells, for example, the milk should be solidified in from 10 to 60 seconds. To accomplish this, the tray and its cover must be surrounded by ice and salt or by solid carbon dioxide, or other suitable cooling means may be used. One convenient way to accomplish this is to maintain direct contact between the tray and cover and the solid carbon dioxide. This contact should be maintained previous to and during the freezing process.

In freezing milk in a shallow depression, the bottom and sides freeze first. This forms an insulating layer which retards the freezing of the remainder of the milk. This forms a pool of unfrozen milk in the center of the depression, which remains unfrozen for a relatively long time. When, however, the refrigerated cover is provided with a knob, like that shown in the figure, which touches the milk in the center of the depression, then this pool of milk is frozen much faster than would otherwise be the case.

After the freezing of the milk, it may be stored at about 10° F. or lower until it is to be used. Or, if preferred, the wafers may be transferred to other receptacles, such, for example, as wide mouthed nursing bottles to be used for feeding infants, and may be stored in those receptacles at a suitably low temperature until it is to be used. If the feeding bottles are used to store the product, it may be allowed to thaw slowly in these same bottles and then warmed to the desired temperature for feeding. One desirable method for slowly thawing the milk is to place the container containing the frozen milk in an ordinary household refrigerator and allow it to stand at approximately 50° F. until completely thawed. The product when treated in this manner will retain its natural emulsion upon thawing and will be digestible for very young infants and prematures, whereas human milk frozen without these special precautions will not retain its natural emulsion, and will not be digestible for young infants.

The composition and characteristics of human breast milk differ widely from those of cows' milk. For example, human breast milk has much more lactose, much more organic phosphatides and other organic products of unknown composition. It contains much less protein but a larger proportion of lactalbumin to casein and it also contains much less inorganic salts. For example, human breast milk may contain more than 5% lactose, less than 2% total protein and less than 0.4% ash. It also differs widely from cows' milk in the ease with which the fat rises and in the instability of the emulsion, and in its lower buffer value, and in the softer quality of its curd when coagulated.

Bacterial action is inhibited while the milk is in a frozen condition and the milk treated in this manner can be packed and shipped in infants' feeding bottles so that contamination in the home or hospital is reduced to a minimum. In this process the only treatment necessary in the home or hospital is allowing the milk to thaw slowly, and then heating it to the temperature desired for feeding, preferably about 98° F.

In describing the invention reference has been made to a single illustration, but it is not intended to thereby limit it to that embodiment. The terms used in describing and claiming the invention have been used in their descriptive sense and not as terms of limitation and it is intended that all equivalents thereof be included within the scope of the appended claims.

What I claim is:

1. A process for preserving human breast milk in the form of a compact wafer and suitable for use in infant feeding, comprising placing it in shallow trays which are in direct contact with solid carbon dioxide and rapidly cooling the sides and middle of the body of milk to freeze it and retain its natural emulsion and digestibility by infants, after it has been thawed and warmed to feeding temperature.

2. In the preparation of infants' foods, the steps comprising cooling human breast milk to slightly above its freezing point and thereupon cooling it in shallow layers sufficiently rapidly to solidify it in about 10 to 60 seconds and form compact wafers of the frozen breast milk.

3. A process for preserving human breast milk in a form suitable for use in infant feeding, comprising rapidly cooling shallow layers of the human breast milk in containers of a material which readily conducts heat in direct contact with solid carbon dioxide and with the contents of the container, said container being surrounded by the carbon dioxide.

4. A process for preserving human breast milk in a form suitable for infant feeding, comprising cooling it to slightly above its freezing point and rapidly solidifying it in shallow trays in direct contact with solid carbon dioxide.

WASHINGTON PLATT.